B. M. W. HANSON.
METAL REDUCING MACHINE.
APPLICATION FILED OCT. 13, 1906.

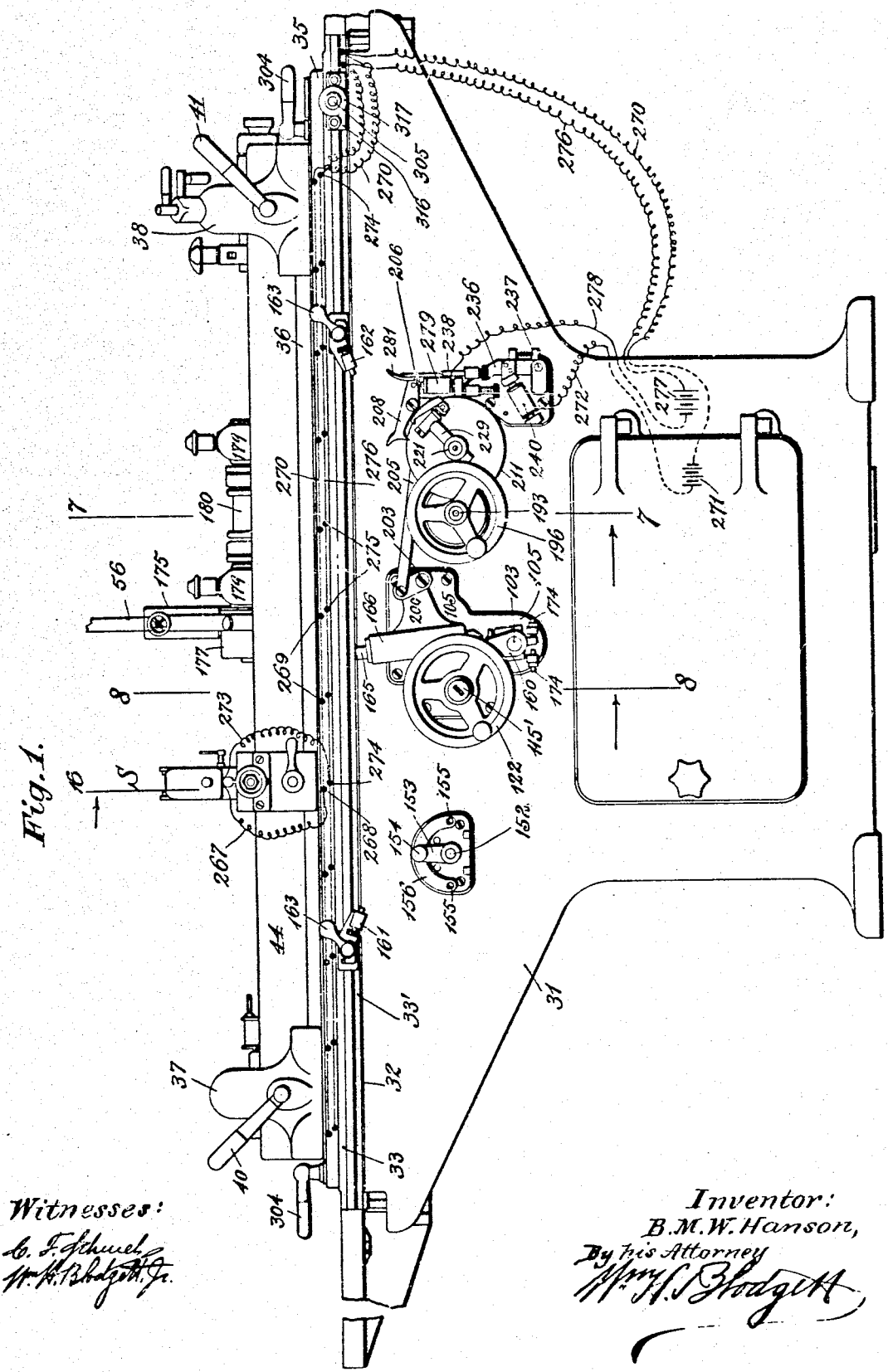

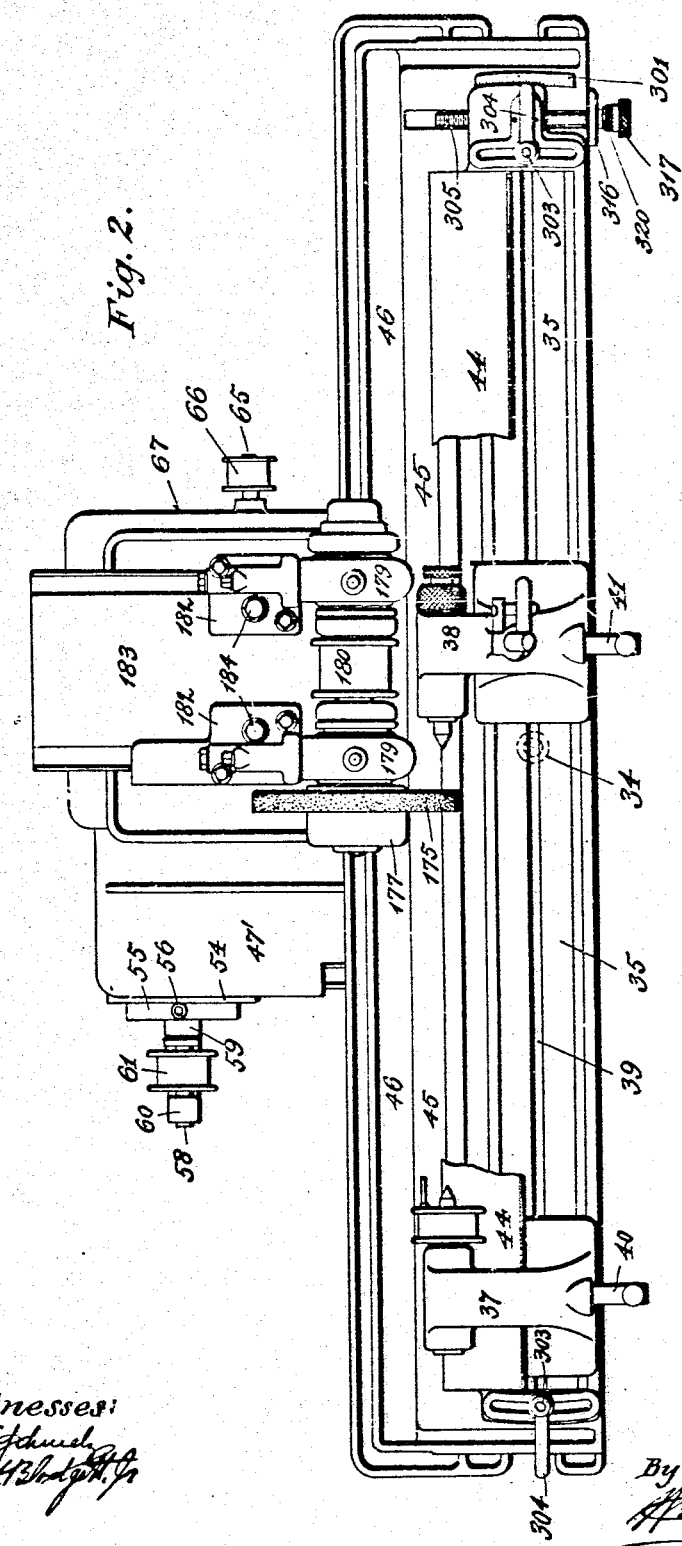

955,642.

Patented Apr. 19, 1910.
15 SHEETS—SHEET 3.

Witnesses:

Inventor:
B. M. W. Hanson,
By his Attorney

B. M. W. HANSON.
METAL REDUCING MACHINE.
APPLICATION FILED OCT. 13, 1906.

955,642.

Patented Apr. 19, 1910.
15 SHEETS—SHEET 4.

Witnesses:

Inventor:
B. M. W. Hanson,
By his Attorney

B. M. W. HANSON.
METAL REDUCING MACHINE.
APPLICATION FILED OCT. 13, 1906.

955,642.

Patented Apr. 19, 1910.
15 SHEETS—SHEET 6.

Witnesses:
Inventor:
B. M. W. Hanson,
By his Attorney

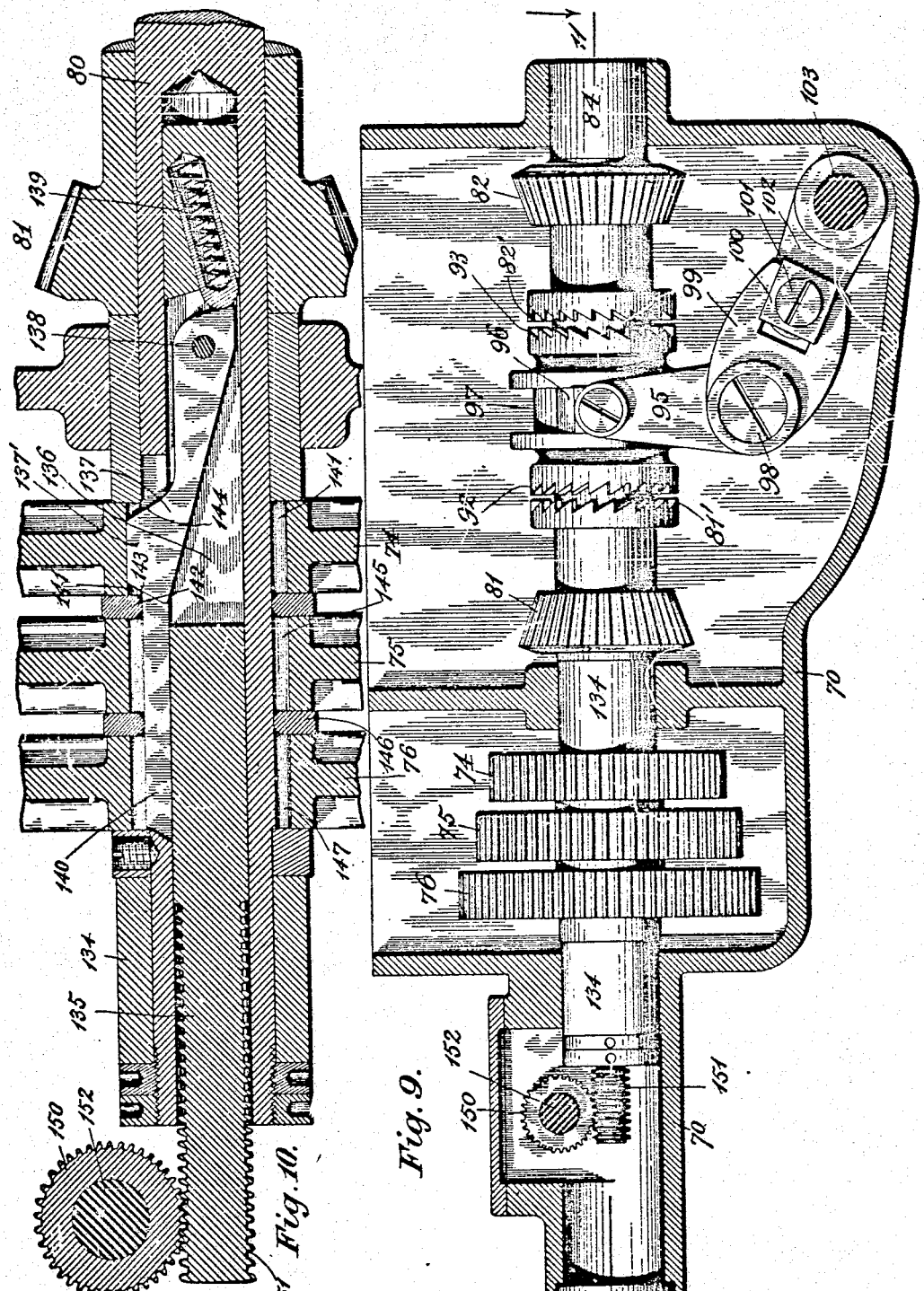

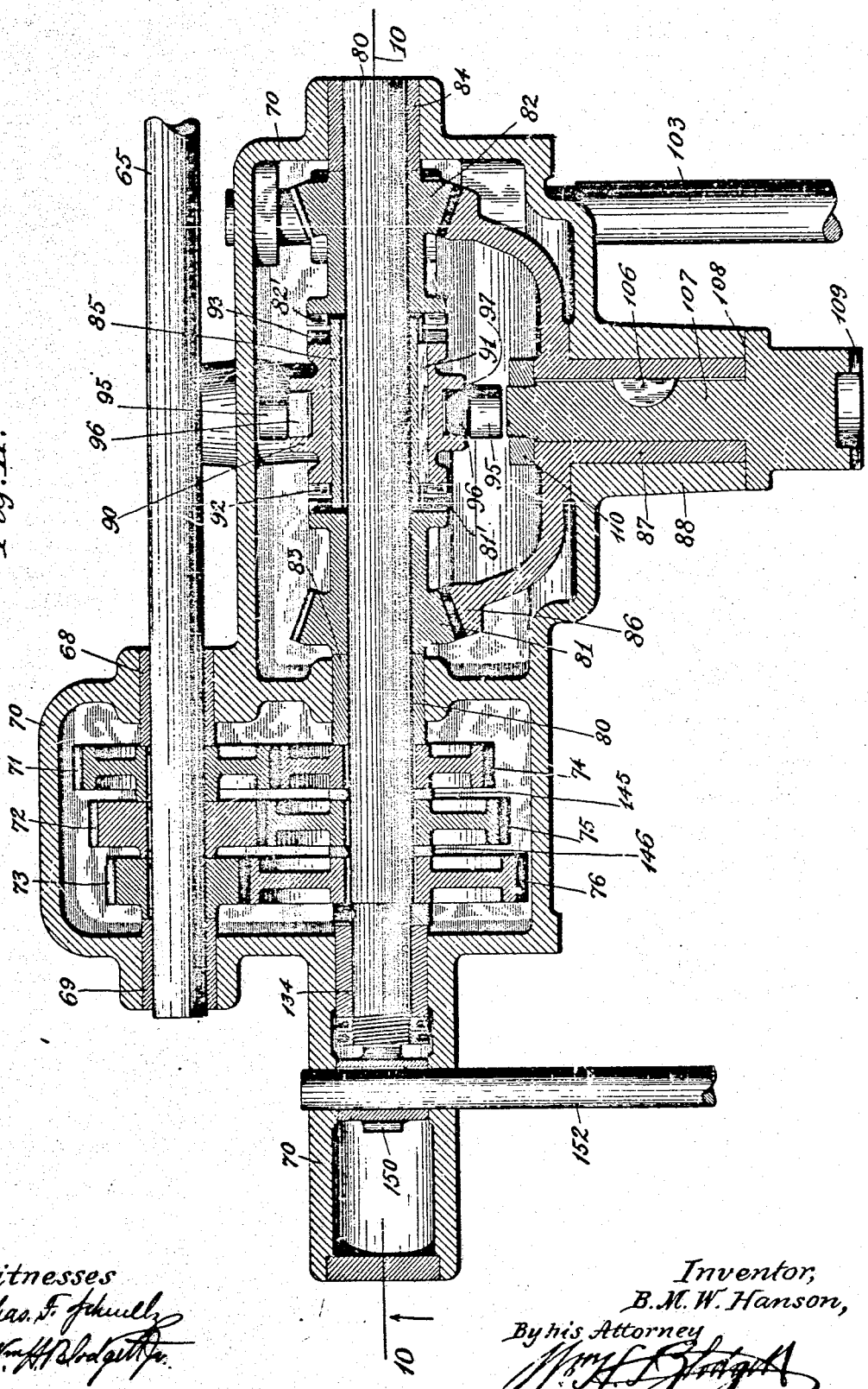

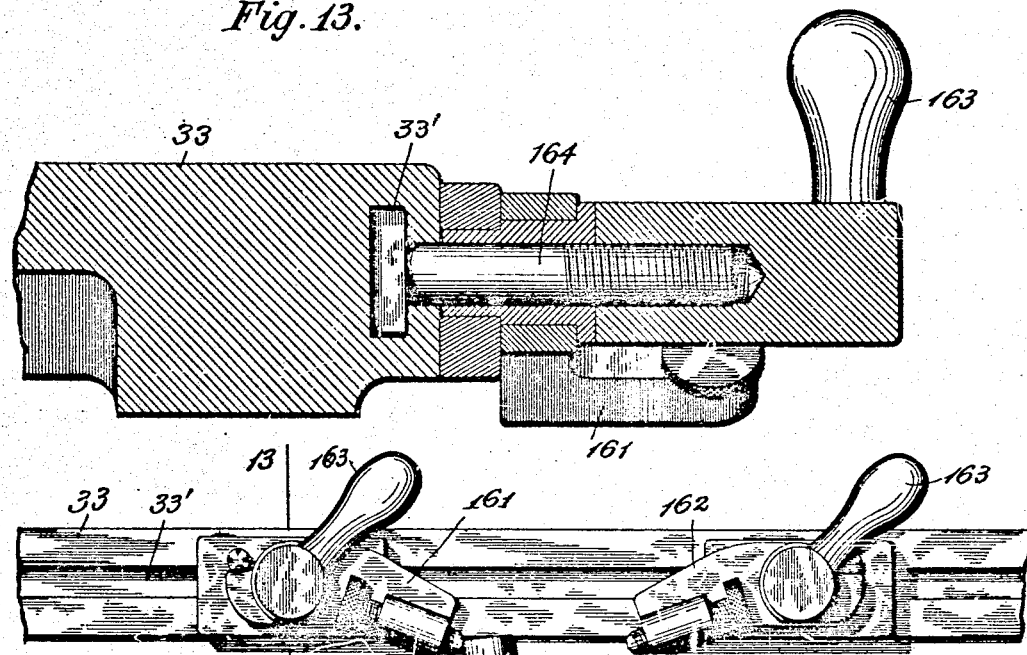
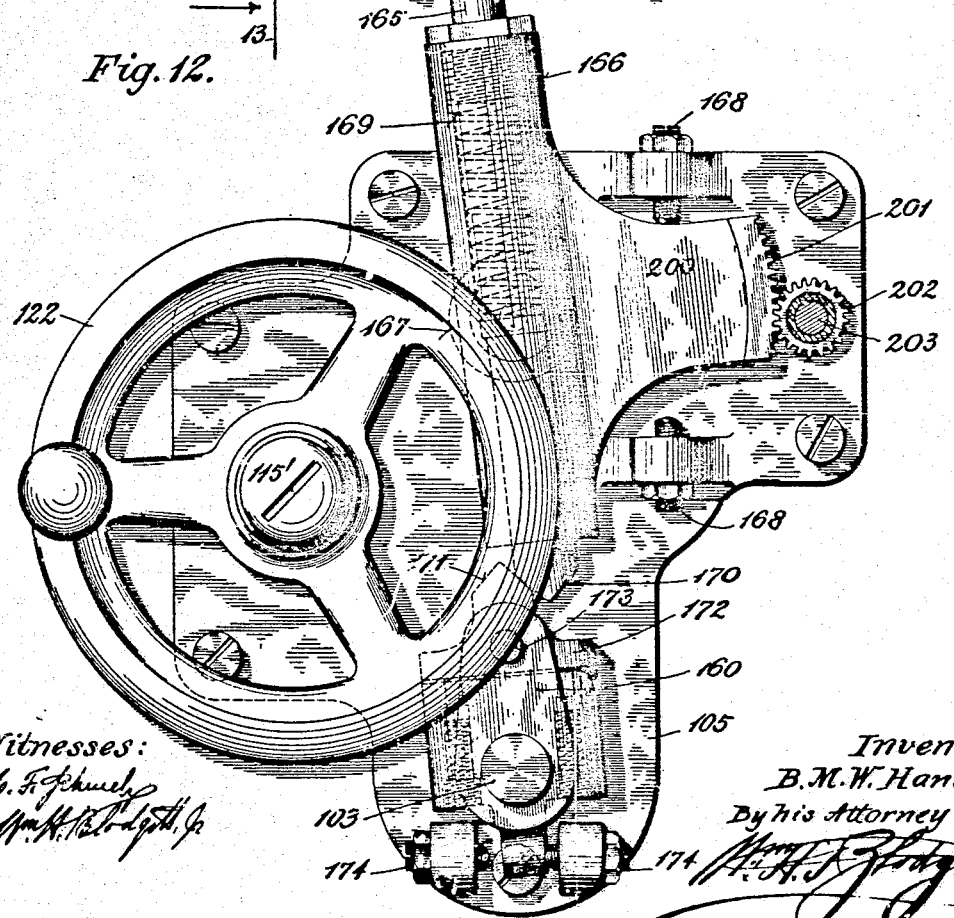

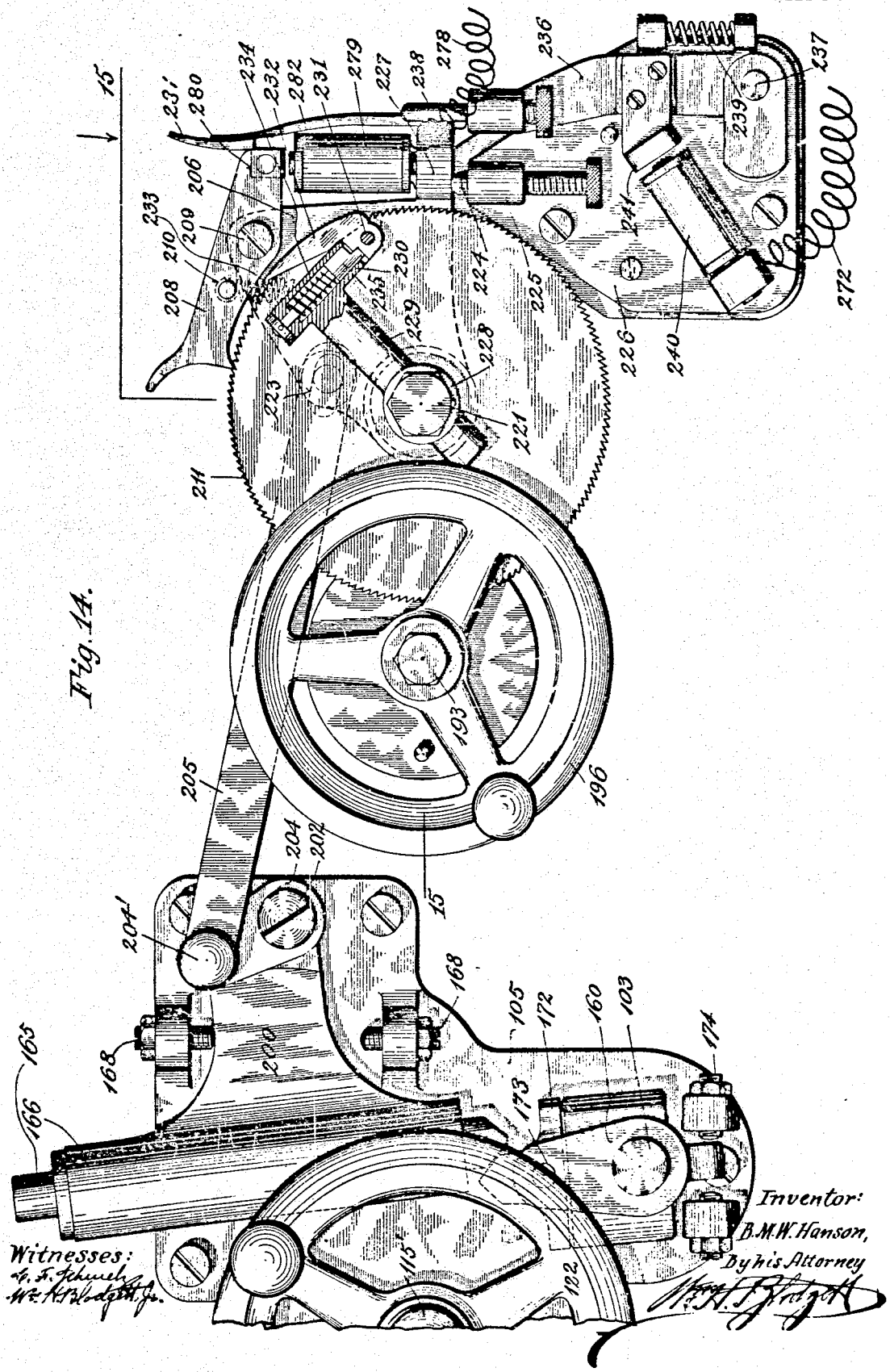

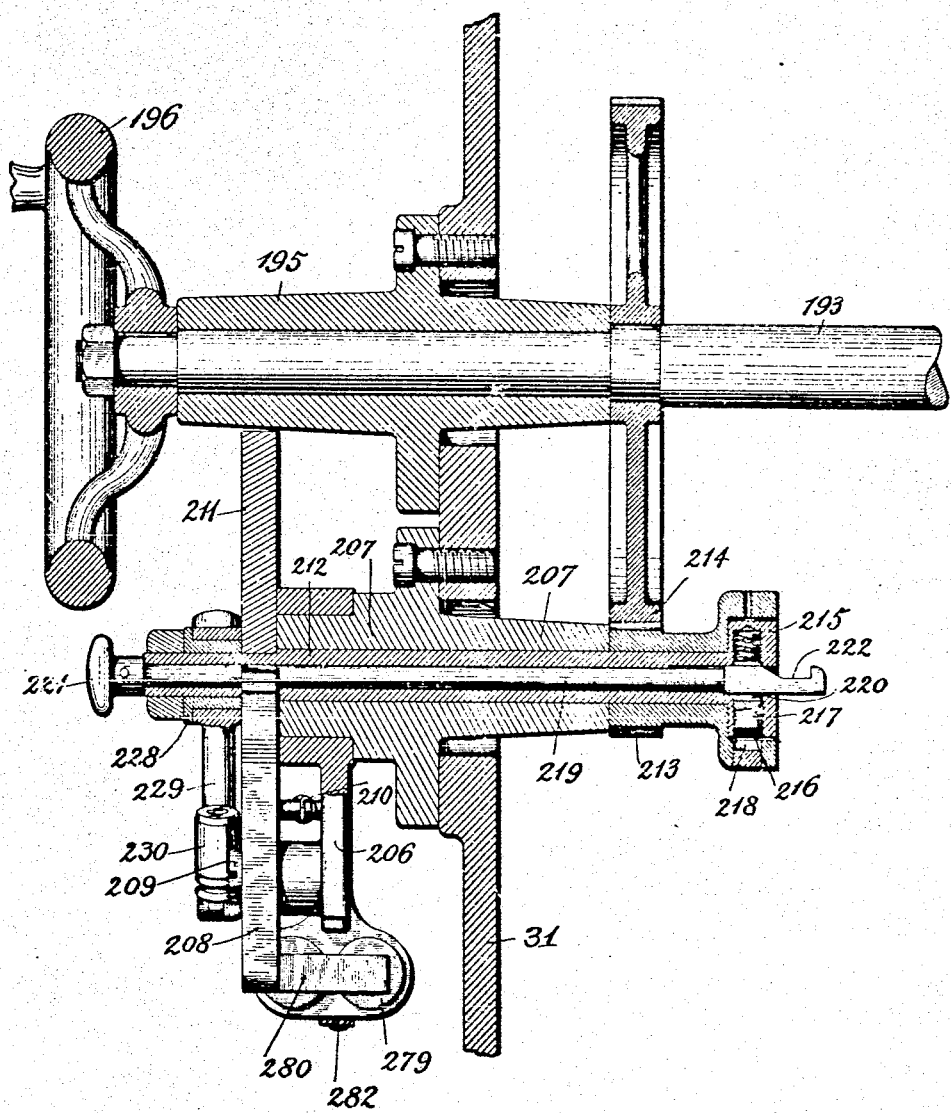

B. M. W. HANSON.
METAL REDUCING MACHINE.
APPLICATION FILED OCT. 13, 1906.
955,642.
Patented Apr. 19, 1910.
15 SHEETS—SHEET 12.
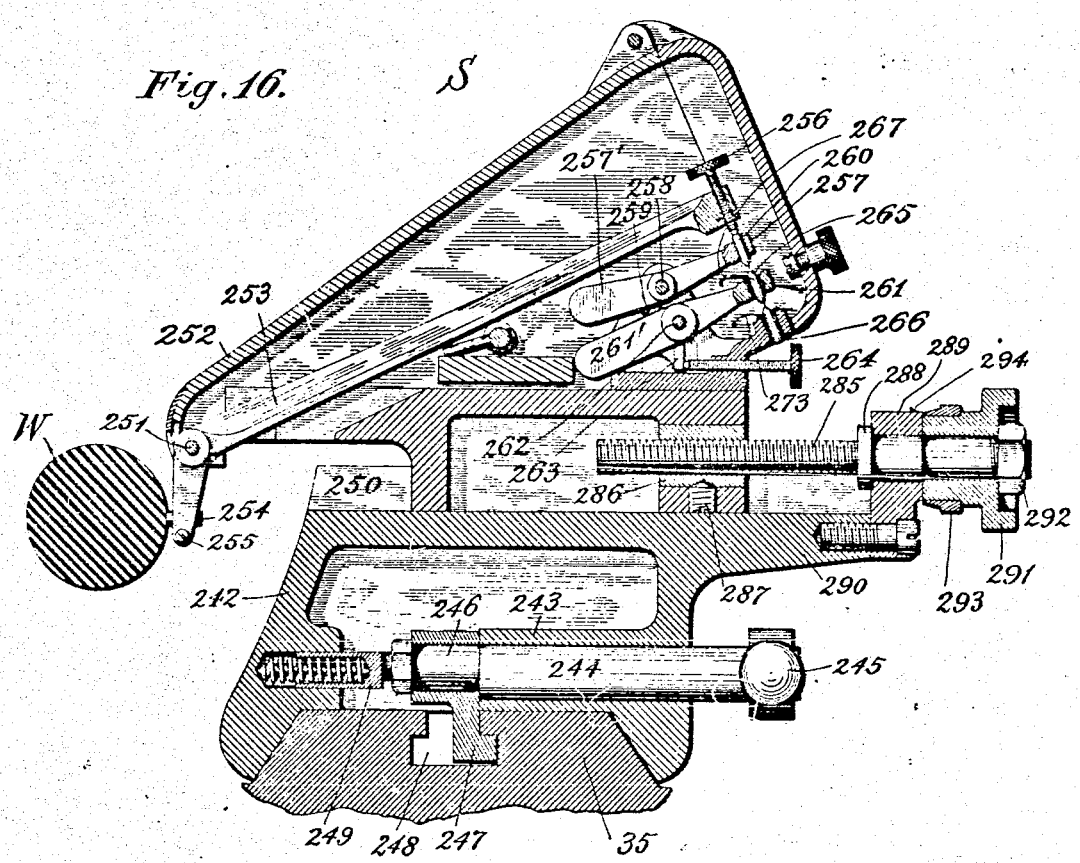
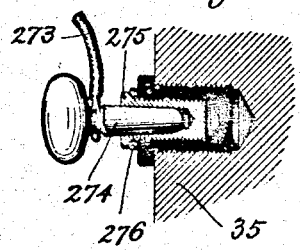
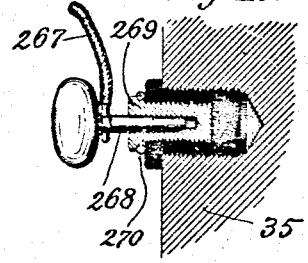
Witnesses:
Inventor:
B. M. W. Hanson,
By his Attorney

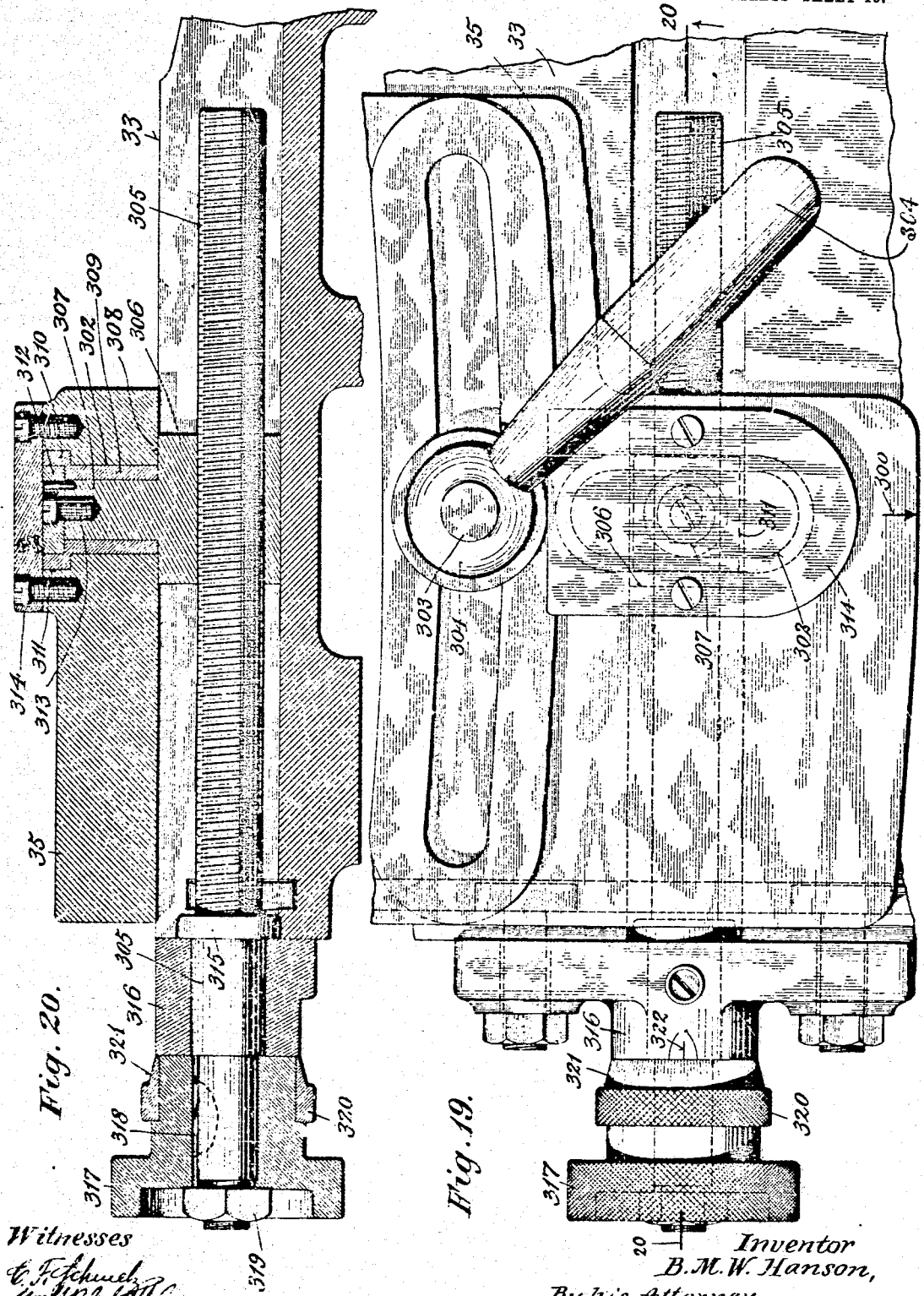

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

METAL-REDUCING MACHINE.

955,642.　　　Specification of Letters Patent.　　Patented Apr. 19, 1910.

Application filed October 13, 1906. Serial No. 338,864.

*To all whom it may concern:*

Be it known that I, BENGT M. W. HANSON, a citizen of Sweden, (having declared my intention of becoming a citizen of the United States,) residing at Hartford, in the county of Hartford and State of Connecticut, have invented certain new and useful improvements in Metal-Reducing Machines, of which the following is a specification.

This invention relates to metal-reducing machines, and more particularly to that class of said machines employed for grinding rods, bars and shafts to true cylindrical form, although it is not limited in use to any especial kind of reducing-tool.

Heretofore, and as exemplified in my patent dated June 30th, 1903, Number 732,181, metal-reducing machines, have been invented in which what is known technically as a "feeler" is employed, said feeler continuously engaging the work, and controlling by suitable devices the movement of the reducing-tool with relation to said work.

Primarily the object of the present invention is a reducing machine involving improvements on the machine of the type described, and one in which either true cylindrical work, or work having a longitudinal taper, may be produced with precisionized accuracy.

In connection with the above the invention further relates to improvements in feed-mechanism controlled by the feeler; to improved means for adjusting the work supporting table, whereby the degree of taper desired may be readily determined; to various coacting ingredients in the gearing for traversing the work-support, the clutches and controlling and arresting devices; and, generally speaking to the machine as a unitary structure involving the combined elements necessary in carrying out the result to be accomplished.

Figure 4:
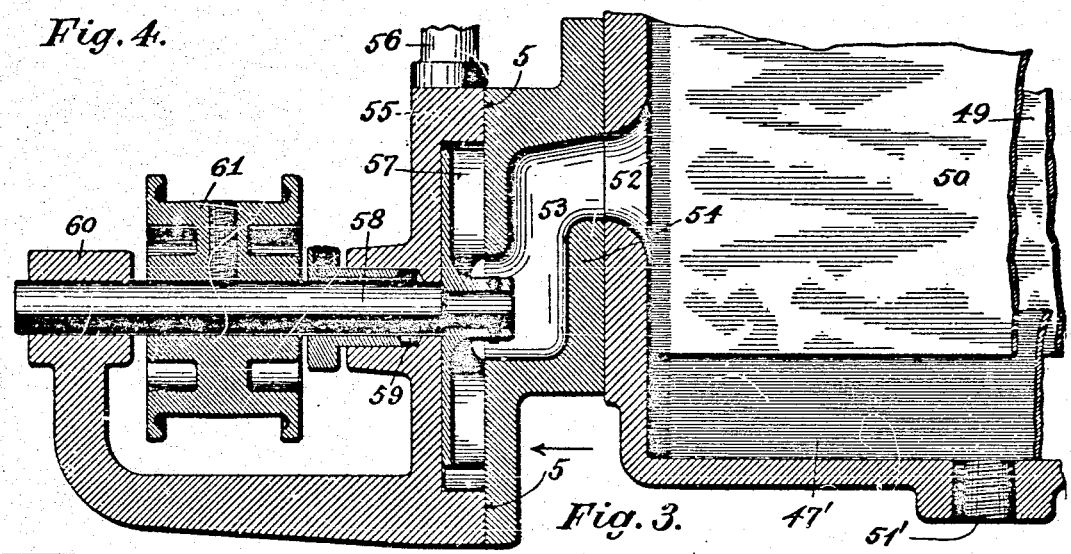
Figure 3:
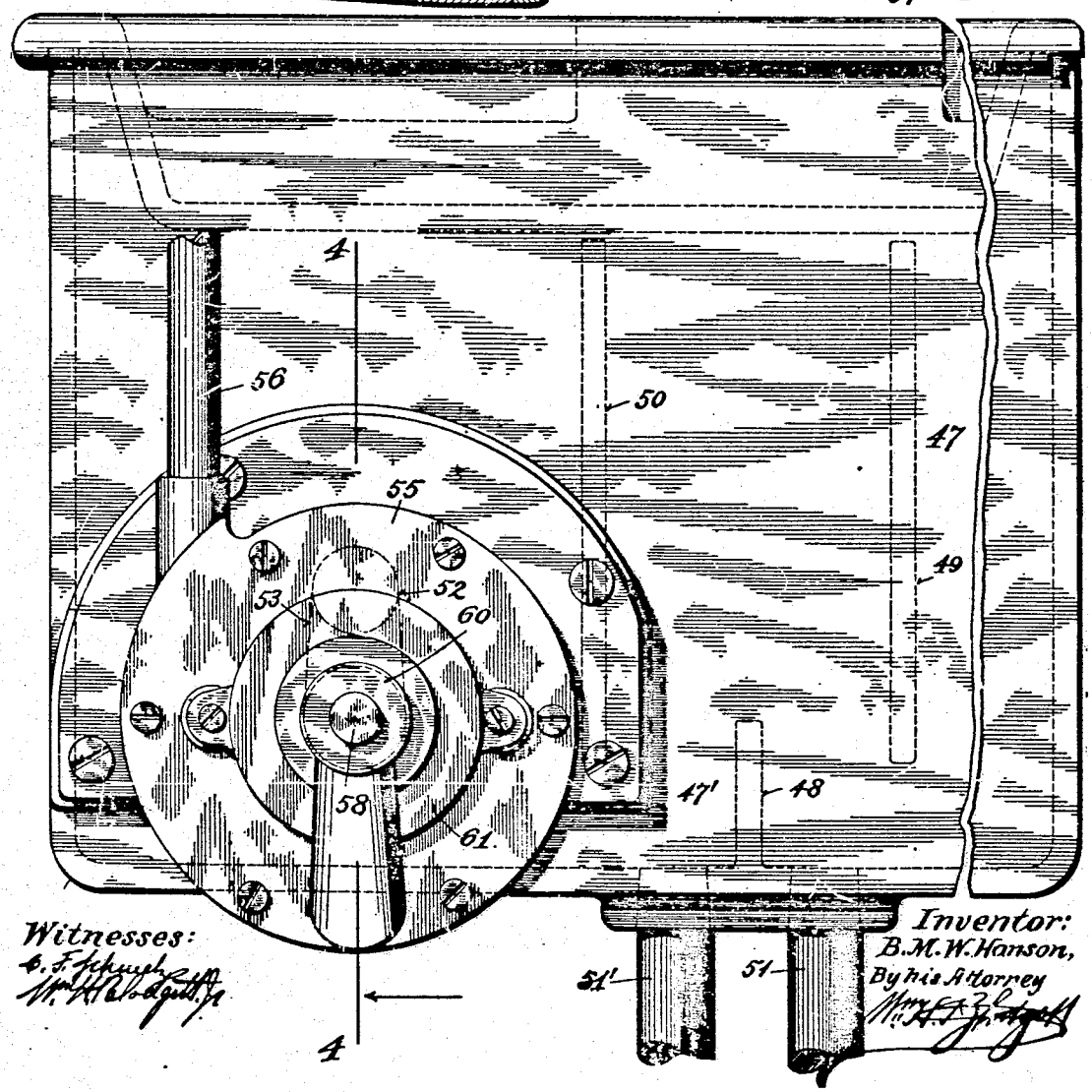
Figure 5:
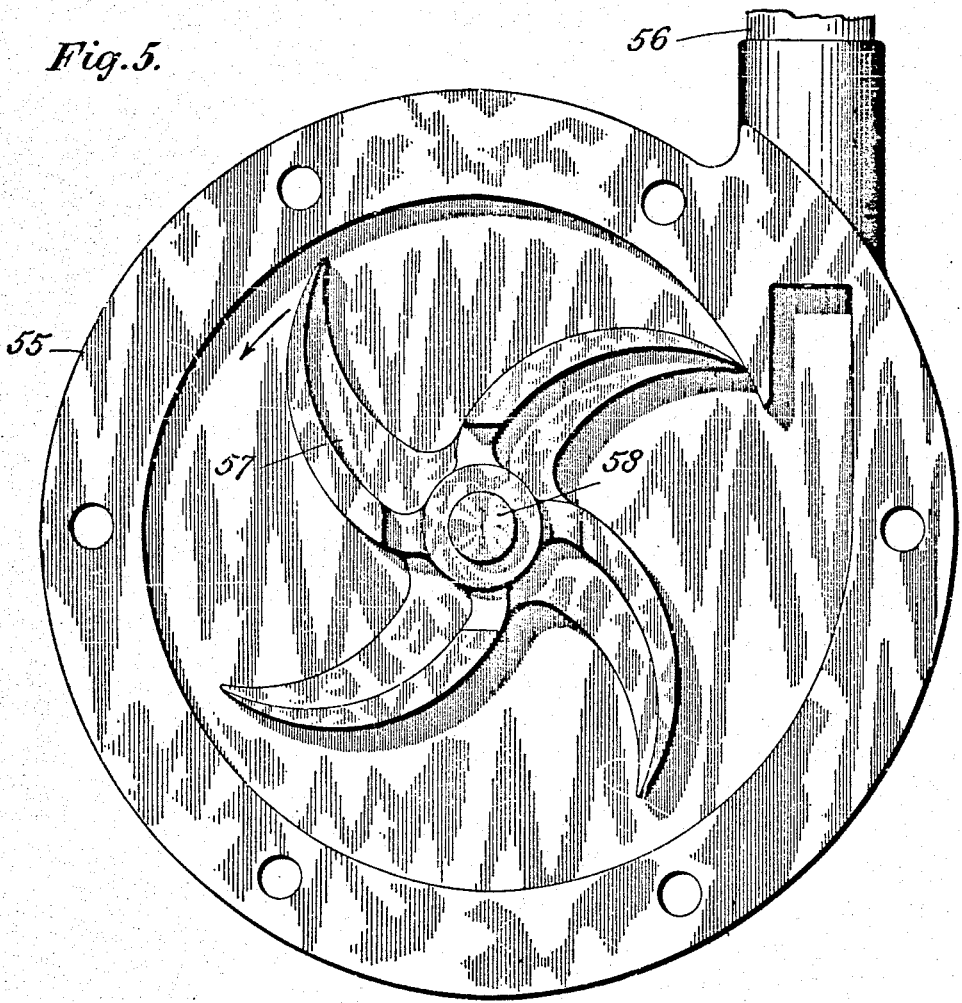
Figure 6:
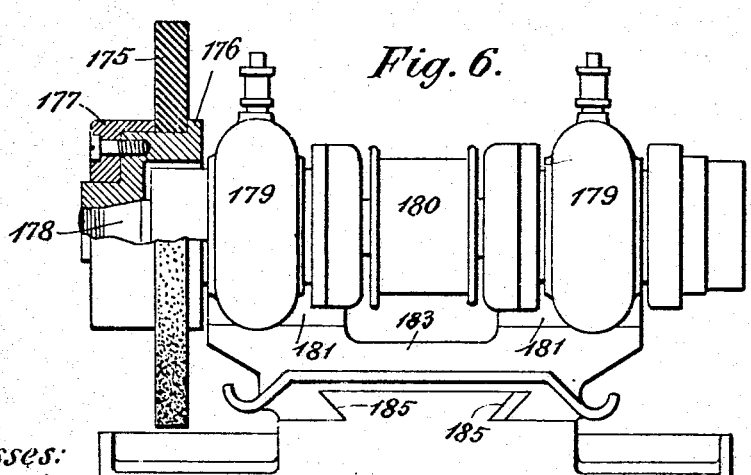
Figure 7:
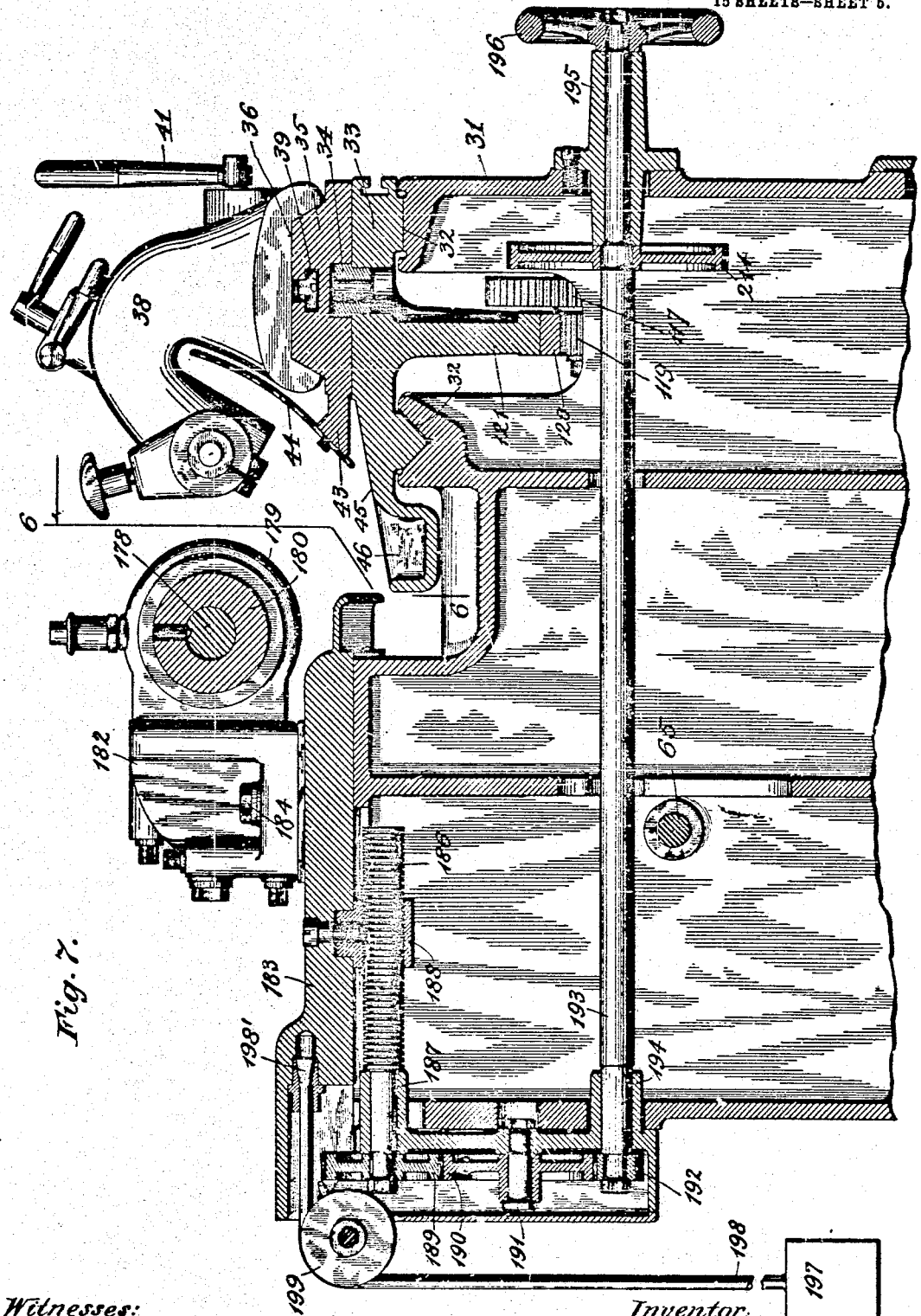
Figure 8:
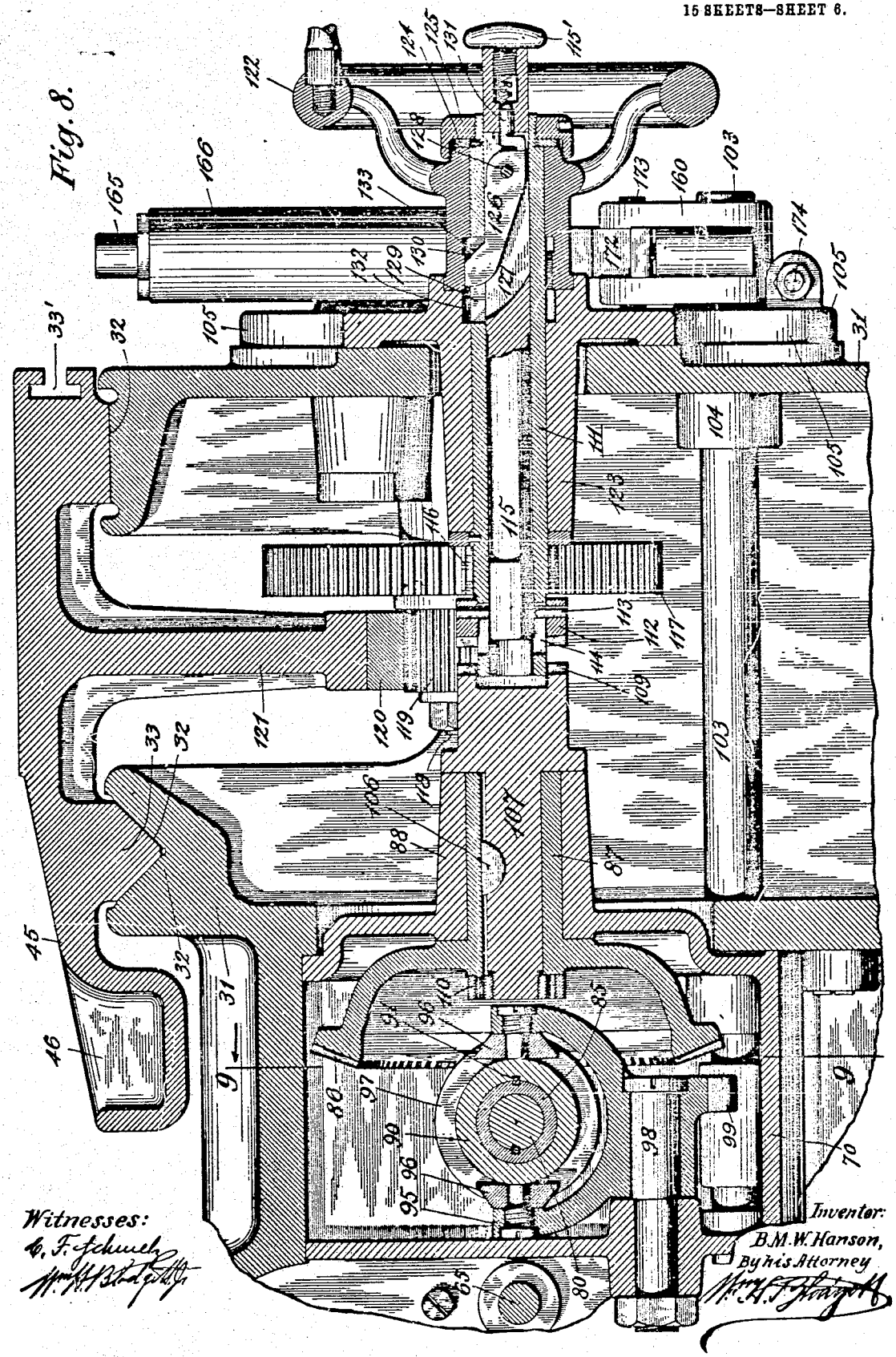
Figure 21:
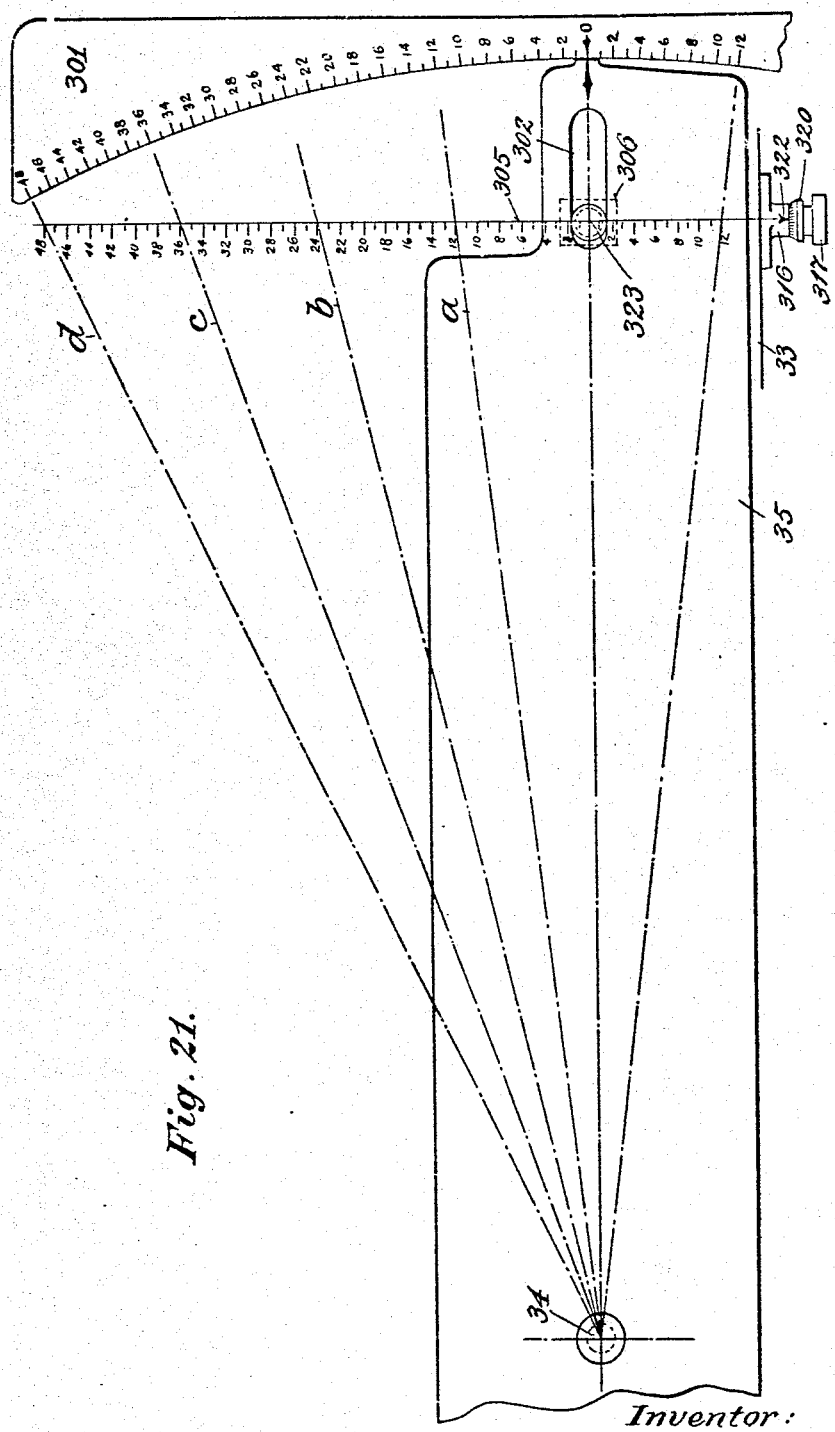
Figure 22:
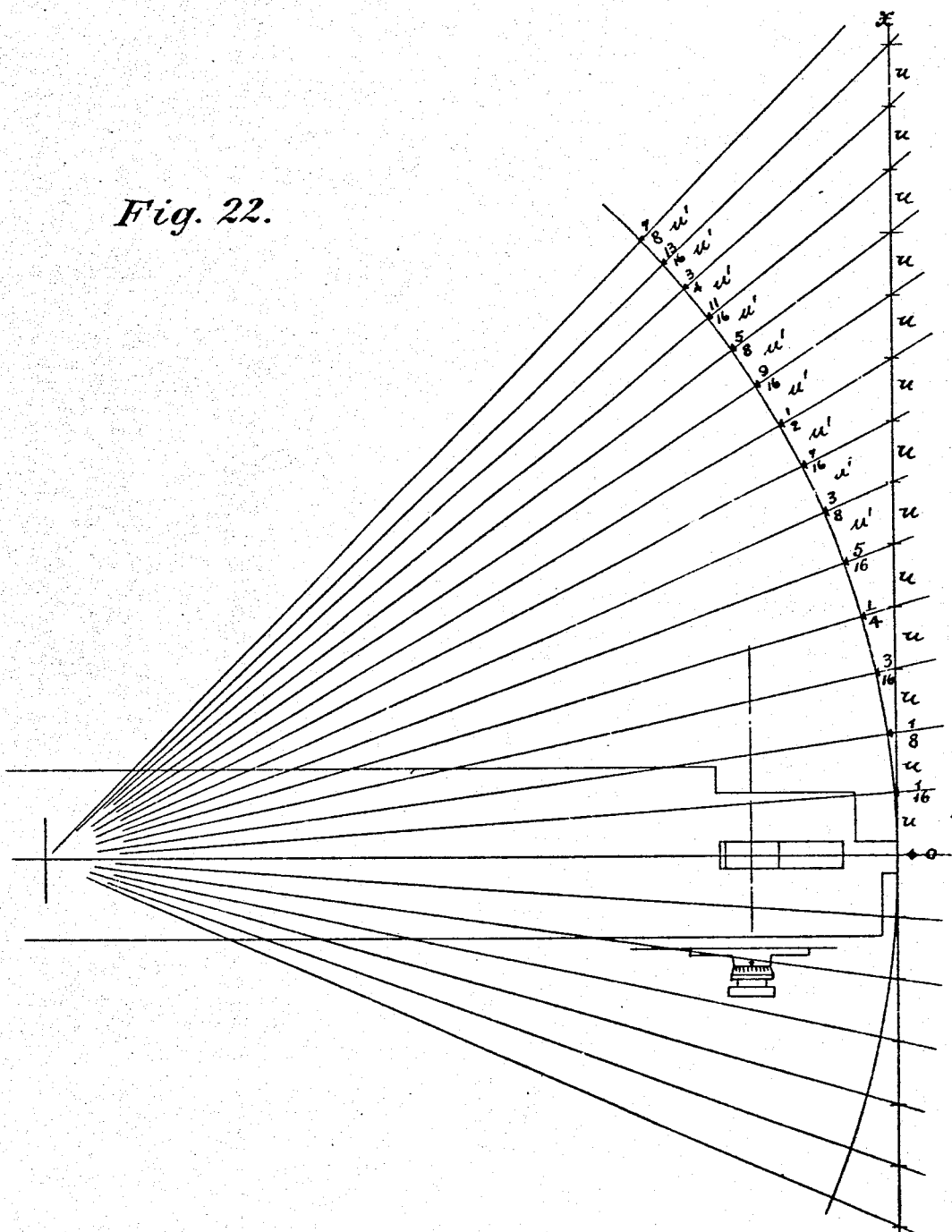

In the accompanying drawings, Figure 1 is a front view of the improved machine. Fig. 2 is a top view thereof. Fig. 3 represents a rear view of a portion of the lubricant-tank and pump. Fig. 4 is a transverse section on line 4—4 of Fig. 3. Fig. 5 shows the interior of the pump case, and the pump. Fig. 6 is a central longitudinal section of the reducing-wheel arbor, other parts being in elevation. Fig. 7 shows a transverse section on line 7—7 of Fig. 1. Fig. 8 is a transverse section on line 8—8 of Fig. 1, and illustrates the carriage-operating mechanism. Fig. 9 represents a section on line 9—9 of Fig. 8. Fig. 10 is a section on line 10—10 of Fig. 11 on an enlarged scale. Fig. 11 shows a horizontal section of the variable speed-changing mechanism, on line 11, 11 of Fig. 9. Fig. 12 is a front view of the automatic carriage-reversing device. Fig. 13 represents, on an enlarged scale, a vertical section on line 13—13 of Fig. 12. Fig. 14 is a front view of the mechanism for feeding the reducing-wheel-slide. Fig. 15 is a horizontal section thereof on line 15—Fig. 14. Fig. 16, shows a transverse section of the device for electrically-controlling the feeding-mechanism,—on line 16, 16 of Fig. 1. Figs. 17 and 18 represent certain connections for the electrical controlling-device. Fig. 19 shows a fractional top view of one end of the carriage platen. Fig. 20 is a section on line 20, 20 of Fig. 19. Fig. 21 is a diagrammatic view of a scale used in connection with the machine, and indicating the deflection of the table relative to a certain length thereof. Fig. 22 illustrates the manner in which the scale graduations are obtained, the drawing illustrating the scale very much enlarged relative to its distance from the pivot-center.

Like numerals designate similar parts throughout the several views.

A type of the class of grinding-machine selected for exemplifying the application of the improvement herein described is shown in Figs. 1 and 2, and a general description of the same will first be given, and then more detailed explanations of the various parts constituting features of the improvement will be set forth.

Referring to the drawings, the hollow base of the machine is indicated by 31, and on the extended top of said base are formed ways 32 for the support and reciprocatory travel of a carriage 33.

Pivoted at 34 to the middle of the carriage 33 is a platen 35 with ways 36 upon which are adjustably mounted a head-stock 37 and a tail-stock 38 clamped in a T-slot 39 by usual bolts operated by hand-levers 40 and 41.

Designated generally by S is a sizing-device supported on the ways 36, and adjustable to any position between the head and tail-stocks, and to be hereinafter described.

An inner lateral extension 43 extends along the length of the platen and supports a curved shield or guard-plate 44 which extends the entire length of the machine and carries off the water used at the point of grinding, and also the residuum resulting from the grinding-operation, to the sloping surface 45 of the carriage 33, and from thence to a trough 46 formed on the inner side of the carriage and draining to the center of the machine and into a tank 47. (See Figs. 3 and 4.) In order to clear the water from all foreign matter, the tank 47 is provided with a comparatively low partition 48 disposed between a pair of partitions 49 and 50; so that the water will be forced to flow beneath the partition 49 and then rise and flow over the top of the partition 48 before reaching the "clear" well 47' of the tank 47. The two tank sections thus established are provided with drain-pipes 51, 51', respectively. The wall of the "clear" well 47' is provided with an opening 52 (see Fig. 4) disposed at some distance from the bottom, and communicates with a passage 53, formed in a channel block 54, and connecting with the chamber of a pump-casing 55 from which the water is forced through a discharge or circulating-pipe 56, to the grinding-wheel. The pump-mechanism is preferably of the centrifugal type (see Fig. 5) and comprises a blade-wheel 57 mounted on a shaft 58 which is journaled in a stuffing-box 59 and a bearing 60 provided on the pump-casing 55, and which carries a driving-pulley 61 to which power may be imparted from any convenient source.

The mechanism for imparting a reciprocatory movement to the carriage 33, above mentioned, may be operated either by hand or by power, in which latter case the mechanism includes means for varying the speed of travel of the carriage, and also means for automatically reversing the movement thereof whenever said carriage has reached the end of its movement in either direction at the option of the operator. Considering at first the power-actuating mechanism, and referring to Figs. 2, 8, 9. 10 and 11, it will be seen that at the rear of the machine there is a shaft 65 having a pulley 66 which may be driven by a belt in any suitable manner. This shaft is journaled near its driving end in the wall of a rearward extension 67 of the base 1, and it is supported at its other end in bearing-bushings 68, 69 held in a casing 70 which contains the speed-changing mechanism above referred to. Disposed between the bearings 68 and 69, and firmly secured to the shaft 65, is a series of gears 71, 72, 73, which are in constant engagement with gears 74, 75, 76, respectively, these latter gears however being normally loose upon a shaft 80, arranged in parallelism with the driving-shaft 65, and adapted to be rotated at different speeds according to which particular gear of its series may be coupled therewith. In the present instance the gear 74 is coupled to the shaft 80 in a manner to be hereinafter described, and, by virtue of the nearly equal diameters of the gears 71 and 74, the shaft 80 will be rotated at approximately the same speed as the driving-shaft 65. Loosely mounted on the shaft 80 are a pair of bevel pinions 81—82, which are prevented from sliding away from each other by the bearings 83, 84, respectively, in which the shaft 80 is journaled; while a sleeve 85 serves to preserve both of the pinions in proper mesh with a bevel-gear 86 having a tubular hub 87 journaled in a bearing 88 of the casing 70. When either of the pinions 81, 82 is connected with the shaft 80 it will be evident, that the bevel-gear 86 will be positively rotated, either in one direction or the other, according to the particular pinion employed. The sleeve 85 is keyed on the shaft 80, and carries on its outer surface a clutch-barrel 90 adapted for longitudinal shifting movement on said sleeve, and rotatable therewith on account of the key connection 91. Both ends of the clutch barrel are provided with clutch-teeth 92, 93, respectively, for engaging corresponding teeth on the hubs of the pinions 81, 82 (see Fig. 9), as the barrel 90 is shifted either to the right or to the left by a fork 95 carrying shoes 96 within the circumferential groove 97 of the barrel. The fork 95 is pivoted on a stud 98 of the casing 70, and is provided with an arm 99 the free end of which is bifurcated to receive a block 100 which in turn is pivoted on a stud 101 held in a crank-arm 102 which is rigidly secured on a shaft 103. This shaft extends toward the front of the machine and is journaled at that end in a bearing 104 which constitutes a part of a plate 105 upon which the mechanism for automatically reversing the movement of the carriage is mounted.

Again referring to the bevel-gear 86 (see Figs. 8 and 11) it will be seen that its hub 87 has a spline connection 106 with a short shaft 107, the particular function of which is to provide a shoulder 108 for holding the gear-hub 87 in proper position within the bearing 88, and which also permits the employment of a high-grade steel arbor in combination with a cast gear, an advantage which will be apparent when it is desired to provide at the outer end of such arbor a series of clutch-teeth 109. As illustrated in Fig. 11, the arbor may be securely held in the hub 87 by a nut 110. Adapted for co-operation, and in alinement with the arbor 107, is a tubular shaft 111 carrying at its inner end a clutch collar 112 which rotates with said shaft, and is mounted for longitudinal sliding movement thereon, as for instance,—by a pin 113 passing diametrically through said collar 112, through the oppositely-disposed slots 114 in the end of the tubular shaft 111, and also through a rod 115, disposed within said shaft 111, which latter has a pinion 116 in engagement with a gear 117 journaled on a stud 118 in the base 31, and the hub of which carries a rack-pinion 119 in engagement with the rack 120 secured to a downwardly-projecting web 121 of the carriage 33.

From the foregoing description it will be understood that when the clutch collar 112 is pushed into engagement with the clutch-teeth 109 of the gear-arbor 107, the table or carriage 33 may be run by power in either direction by shifting the clutch-barrel 90 into engagement with either one or the other of the pinions 81—82.

In the drawings the shafts 107 and 111 are shown as being disconnected, so that in the present instance, the carriage 33 may be moved by hand, as follows: Loosely mounted on the outer end of the tubular shaft 111 is a hand-wheel 122, the hub of which rests with one end against the flanged bearing 123 (which also supports said shaft 111), and the other end of which rests against a washer 124 and nut 125, thus preventing any shifting movement of the hand-wheel on the shaft 111. In order to establish a co-action between the hand-wheel and the tubular shaft for the purpose of enabling the operator to move the carriage in either direction by hand, means are provided for connecting the hand-wheel with the primary driving member or carriage-actuating shaft 111, and at the same time to disconnect this shaft 111 from the power-actuated mechanism, so that the operator need not expend his energy in operating machine-elements which are of no use in that instance, as for example, the arbor 107, bevel-gear 86 and the pinions 81 and 82. As a matter of fact, in view of the provision of the clutch-collar 112 and teeth 109, it is entirely immaterial whether either of the bevel-pinions is in clutch with the barrel 90 and consequently under the control of the driving-shaft 65.

The means for connecting the hand-wheel 122 to the shaft 111, are clearly shown in Fig. 8, and preferably consist of a dog or key 126 disposed within a slot 127 of the rod 115, and pivoted at 128. The free end of the key 126 projects and plays through a slot 129 in the tubular shaft 111, so that in this manner both the rod 115 and shaft 111 are caused to be rotated together, while, on the other hand, the rod 115 may be shifted longitudinally (to cause an engagement of the clutch-members 109, 112) without affecting the shaft 111.

The inner surface of the handwheel-hub is provided with a series of notches 130 adapted to be engaged by the dog 126, which is thus operated by a spring-actuated plunger 131 in the rod 115 so that, when the hand-wheel is rotated, the tubular shaft 111 and the rod 115 are likewise rotated, thus actuating the gear 117 and consequently moving the carriage 33. When it is now desired to throw the power-mechanism, a longitudinal push against the button end 115' of the rod 115 will bring the clutch-members 112 109 into engagement, and at the same time, the free or locking end of the dog 126 will be carried beyond the hub of the hand-wheel 122 and into a clearance space 132 within the bearing 123, thus disconnecting the hand-wheel from the shaft 111. It will be noted that the dog 126 has an inclined face 133, to facilitate its reëngagement with the notches 130, whenever the rod 115 is pulled outward to disconnect the power-mechanism.

As above stated the power-actuated mechanism for operating the carriage 33 comprises a variable or speed-changing device, of which the gears 71, 72, 73 on shaft 65, and the gears 74, 75, 76 on shaft 80 are members. In order to enable the operator to select and couple either one of the gears 74, 75, 76, to the shaft 80, I preferably employ means such as are illustrated in Figs. 9, 10 and 11 of the drawings. Referring at first to Fig. 9, it will be seen that the shaft 80 is journaled in bushing-bearings 83—134 which are supported on the casing 70 above referred to. Furthermore, the shaft 80 is tubular to receive a rod or spindle 135 which is slotted at 136 and carries a dog or key 137 pivoted at 138 on the rod 135 being acted upon by a spring-actuated plunger 139 to force its free end 137' outward through a slot 140 in the tubular shaft 80 and into engagement with one of a series of notches 141 provided on the interior surface of the hub of the gear 74. Consequently, the latter is in this instance firmly locked against rotation relative to the shaft 80. When it is desired to connect the gear 75 to the shaft 80, it will become necessary first to disconnect the gear 74, and this is accomplished through the intervention of a washer 142 having rounded inner edges to act upon the inclined front face 143 of the dog 137 when the latter is carried from right to left by a corresponding sliding movement on the part of the rod 135, a rear incline 144 being provided on the dog 137 to throw the latter inward during the reverse movement of said rod. As soon as the free end of the dog 137 has passed from under the washer 142, the plunger 139 will again throw the dog outward, and into one of a series of notches 145 of the next gear 75. The change from this gear to the last one, 76, of the series may be effected in a like manner by virtue of a washer 146, and the notches 147 in the gear 76. The rod 135 is moved toward the right or left by a pinion 150, in engagement with a series of peripheral rack-teeth 151 which extend around the surface of said rod so as not to interfere with the rotation thereof and yet be under constant control of the pinion 150. The latter is secured upon the transverse shaft 152 journaled in bearings in the casing 70 and the base 31, and having at its front end a lever 153, see Fig. 1 which is provided with a spring-actuated locking-pin 154 adapted to enter any one of a series of three recesses 155 on a stationary segmental plate 156, the location of said recesses being such as to gage the peripheral travel of the pinion 150 to shift the rod 135 sufficiently to bring the dog 137 into proper engagement with the desired gear.

The mechanism just described will enable the operator to move the carriage by power at any one of the three speeds within the capacity of the machine, and it should be understood that the ratios as well as the number of such speeds may be modified as desired without in any way altering the gist of the invention.

While it is evident that the direction of movement of the carriage is under the direct control of the operator, by virtue of the two-face clutch barrel 90, above mentioned, and also the shaft 103, whereby the clutch fork 95 is shifted to run the carriage either to the right or to the left, I deem it advantageous to provide means whereby the movement of the carriage may be automatically reversed by and upon its arrival at a predetermined point. To accomplish this result, the front end of the clutch-actuator 103 carries an arm 160 which is indirectly acted upon by a pair of dogs 161, 162, each of which may be secured to the front edge of the carriage 33, and at any desired point longitudinally thereof, as, for instance, by a handle-nut 163 engaging a bolt 164, the head of which is disposed within a T-slot 33′, of well known construction (see Fig. 13). The dogs 161, 162 are adapted, during the travel of the carriage 33, to strike against the upper end of a stud 165, mounted for a slight longitudinal movement in a barrel 166, which is pivoted at 167 on the plate 105 previously mentioned, and may have an oscillatory movement as limited by screws 168, 169 held on said plate. The gravitative tendency of the stud 165 is enhanced by a spring 169 which serves to bring the lower double beveled end 170 into forcible contact with the oppositely-beveled end of a latch 171 rising from a plate 172, pivoted at 173 on the bifurcated arm 160 and held in normally-central position relative thereto by a pair of spring-actuated plungers 175, 175′ (see Fig. 12). These yielding plungers have for their particular object to minimize the effect of the jar or shock which naturally results from the striking contact of either of the dogs 161, 162 against the end of the stud 165 when the carriage is under way, or in other words to avoid the vibration which would be caused by a dead blow, when the several parts are contacting directly. The clutch-actuating shaft 103 is as a matter of fact a rock-shaft, and is on account of the stud 165, either in its right or left-hand position, the throw in either direction being limited by adjustable screws 174 carried by the plate 105. This circumstance entails the engagement of either one end or the other of the clutch-barrel 90 with its adjacent bevel-pinion, so that, therefore, the provision of means for disconnecting the power-mechanism from the carriage-driving-gear, either to stop the movement of the latter entirely, or to operate the same by the hand-mechanism, becomes a matter of necessity in addition to that of the convenience previously mentioned.

In order to avoid confusion or misunderstanding it may be stated here, that while Figs. 12 and 14 show the several outer elements of the automatic reversing mechanism in a proper working position, the inner elements of this mechanism shown in Figs. 9 and 11, are represented in their central, or "passing" position in order better to distinguish between some of the adjacent parts.

That the clutch-barrel 90, or more properly speaking, its rock-shaft 103, is securely locked against accidental displacement, may be clearly seen in Figs. 12 and 14 inasmuch as the spring 169 of the stud 170, forces the latter against the latch 171 in a wedgelike manner, and the entire reverse mechanism is definitely positioned by virtue of the stops or limiting screws 168 and 174.

From the foregoing description it will be obvious that in the present machine, the work to be finished is traversed back and forth in front of the reducing or grinding-wheel, and that the path of this travel is unchangeable by virtue of the movement of the carriage 33 on the fixed ways 32 of the bed or base 31. In order to permit the approach of the grinding-wheel toward the work, and also to compensate for the wear of this wheel during the grinding operation, the wheel-supporting arbor is mounted in bearings on a slide which is movable transversely of the base 31, and on the rearward extension 67 above referred to, and this slide may be moved toward the work by two distinct mechanisms, both of which have some elements in common, and which enable the operator to feed the wheel either by hand entirely, or to render the feed an automatic one, and so that a comparatively coarse feed may be established at first and until the work has been ground to very nearly its desired size, and the feed is then reduced to micrometrical feeding distances to complete the reduction of the work to the exact required size without attention of the operator, it being understood, of course, that the final or finishing feed of the wheel is entirely stopped automatically as soon as the work has been ground to its finished dimension.

The general organization of the mechanism for supporting the reducing or grinding-wheel is illustrated in Figs. 1, 2, 6 and 7, in which 175 denotes the reducing or grinding-wheel, which is clamped upon a holder 176 by a collar 177. The holder 176 is secured upon an arbor 178 journaled in suitable bearings 179 and having a pulley 180, whereby the arbor may be driven from any convenient source. The bearings 179 are carried in brackets 181 mounted for lateral adjustment relative to swivel-blocks 182 secured on the slide 183 by bolts 184. The slide 183 is mounted for movement on ways 185 at the top of the rearward extension 67, previously referred to, and is actuated by a mechanism clearly shown in Fig. 7, and comprising a feed-screw 186 journaled near its outer end in a bearing 187 and engaging a nut 188 secured to the under side of the slide 183. At its outer end the feed-screw 186 carries a pinion 189 which is driven (through an intermediate gear 190 on a stud 191) from a pinion 192 secured upon the rear end of a transversely-disposed shaft 193 journaled in bearings 194, 195, and having at its front end a hand-wheel 196, whereby the operator is enabled to control the position of the wheel-carrying slide 183 at pleasure, all backlash between the feed-screw 186 and the slide-nut 188 being taken up by a weight 197 suspended at the end of flexible band 198 which passes over an idler 199 and is attached to the rear end of the slide 183, as at 198′.

As above stated the reducing or grinding-wheel 175 may be automatically fed during and by the movement of the carriage, and I deem it advantageous to organize the mechanism for accomplishing this result, in such a manner that the feeding operation takes place at the end of the carriage travel in one direction only, in going from left to right, the position of the carriage in Fig. 14 being that occurring on the point of starting the feed-mechanism by the action of the dog 161, to reverse the carriage travel, and as follows: Referring to Fig. 12, it will be seen that the barrel 166 of the reversing mechanism is provided with an extension 200 which has segmental teeth 201 in engagement with a pinion 202 mounted upon a stud 203, on the front plate 105 and carrying a crank-arm 204 (see Figs. 14 and 15) the end of which is connected by a link 205 with an arm 206, which constitutes one of the automatic feed-elements. This arm 206 is loosely mounted for oscillation upon the outer cylindrical surface of a bearing bracket 207 secured to the front face of the base 31, and carries a pawl 208, pivoted at 209 on said arm 206 and normally forced (by a spring 210) into engagement with the teeth of the ratchet-wheel 211, secured upon a spindle 212 which is journaled in the bearing 207 above mentioned. The spindle 212 supports at its rear end a pinion 213, in constant engagement with a gear 214 on the feed-shaft 193, and adapted to be locked to or disconnected from the spindle 212, so as to enable the operator to throw the automatic feeding-mechanism into or out of action. The mechanism for connecting and disconnecting the spindle and pinion is clearly shown in Fig. 15, in which the spindle 212 is illustrated as having a head 215 provided with an aperture 216 for receiving a spring-actuated locking-plunger 217 which is adapted to enter a recess 218 in the interior surface of the hub 213′ of the pinion 213. While this plunger 217 normally tends to seat itself in the recess 218 and thus lock the shaft or spindle 212 and the pinion 213, this action may be prevented by a slidable rod 219 disposed within the spindle 212 and having its rear end passing through a slot 220 in the plunger, and which when pushed inward, will raise the plunger out of the recess 218, it being evident that when the rod 219 is pulled outward by the button end 221, the plunger may again seat itself within said recess by virtue of the reduced portion 222 in the rear end of the rod.

From the foregoing description it will be understood the automatic reversal of the carriage movement entails the feed movement of the grinding-wheel toward the work, and, inasmuch as the oscillatory movement of the crank-arm 204 will always be the same, it may be inferred that the angular movement of the pawl-arm 206 would likewise be invariable, and thus feed a certain number of teeth each time, a circumstance which is objectionable, in view of the fact that the amount of the feed required, changes considerably according to the material of the work, and the grade of the grinding-wheel used. Consequently the pawl-actuating mechanism is so organized that the operator is enabled to reduce the feed to one ratchet-tooth if necessary, and this result is attained by providing in the end of the link 205, a slot 223 of such length as to permit the pawl-arm 206 to be maintained in a sufficiently forward position, that its forward movement, as caused by the link, will not exceed one tooth's space. This position is in the present instance obtainable by a stop-screw 224, held in a lug 225 of the front plate 226, and engaging a projecting ear 227 of the pawl-carrier 206, and it is evident that the more the pawl-arm 206 is raised by the screw 224, the less will be the number of teeth advanced by the movement of the link 205. The design of the feed-mechanism illustrated in the drawings is such that each tooth of the ratchet-wheel 211 will advance the grinding-wheel for a distance equal to 1/4000 of one inch, and consequently reduce the diameter of the work 1/2000 of an inch, and inasmuch as such a feed would be rather slow and incur a waste of time during the "roughing" out process, while on the other hand such a fine feed is very desirable in the "finishing" process, means are provided whereby the pawl carrier, after having fed the grinding-wheel forward sufficiently; nearly to finish to size, will be checked in its return movement so that the actual feed-movement thereof will be gradually reduced to only one tooth at a time, until it is finally rendered entirely inoperative upon the completion of the work to "finished" size. The means employed for this purpose consist in the present instance of three distinct members, viz: a shield which may be set so as to cover the teeth of the ratchet so as to prevent the pawl from engaging any of them; an electro-magnet whereby the return-movement of the pawl-carrier will be reduced so as to cause the pawl to engage only such a number of teeth as may in the operator's judgment be desirable; and another electro-magnet which will raise the pawl out of reach of the teeth until again released by the operator. Of these three elements just mentioned, the shield has for its particular purpose to enable the operator to reduce a finished piece of work for a certain number of 1/1000 of an inch, by merely counting the number of teeth on the ratchet-wheel, and without resorting to the use of calipers.

Mounted in front of the ratchet-wheel 211 and on a bushing 228 which is loose on the spindle 212, is an arm 229, having at its outer end a transverse head 230. Pivoted at 231 and within the bifurcated end of the head 230, is the shield or guard 232 having at its free end a lip 233 adapted to be placed in any one of the ratchet-teeth 211, and having its protecting-plate extending back over a sufficient number of such teeth to prevent any engagement of the pawl 208 therewith. The lip 233 is retained within the ratchet-tooth by the action of a spring 234 and plunger 235, thus intimately connecting the shield and ratchet for coactive movement. In order to illustrate the function of the shield, let it be supposed that the diameter of the finished work, is, in some portion thereof, to be reduced for 12/1000 of an inch; the operator will then count twenty-four teeth back from the most advanced position of the pawl 208, and set the lip 233 into the ratchet-tooth. Consequently the pawl 208 cannot under any circumstances advance the grinding-wheel more than 24/4000 of an inch, which is equal to grinding off 6/1000 of an inch all around the work and consequently reduces its diameter by 12/1000. Inasmuch as the feed of more than six teeth at once would in practice be rather too much, on account of overheating, and the possible destruction of a fine grade grinding-wheel, and therefore this number should be reduced to one tooth in some instances, means are provided for checking the return movement of the pawl-carrier 206, so that, for instance, the pawl 208 cannot take more than two teeth at a time, these means comprising an electro-magnet which is operated to position a movement-checking device in the path of the pawl carrier 206, when the work has been sufficiently reduced to require only a finishing feed. This mechanism includes also what may be termed a "feeler" which rests against the work, and closes an electric circuit at the proper time.

Referring first to Fig. 14, 236 denotes a lever pivoted at 237 on the plate 226 and carrying at its free end a stop-screw 238 adapted to be projected, by the rocking movement of the lever 236, under the ear 227 of the pawl-carrier 206, this movement being effected against the action of a spring 239, and through the energization of an electro-magnet 240 to attract an armature 241 carried by said lever. The electric-current for this magnet is established by the sizing-device S, previously mentioned, and shown in detail in Fig. 16, in which W represents the work to be operated upon and supported on centers in the head-stock and tail-stock (not shown) of the machine. The sizing-device S may be secured upon the top of the platen or table 35, at any point longitudinally thereof, and comprises a bed-plate 242 having an inwardly-projecting lug 243 which serves as a bearing for a clamping-shaft 244 provided at its outer end with a handle 245 and having at its inner end an eccentric portion 246 on which a shoe 247 is supported. This shoe is preferably L-shaped and projects into a correspondingly-formed slot 248 in the upper face of the platen 35 and serves as a means for firmly clamping the bed-plate 242 in place. A spring-actuated plug 249 serves to force the shoe and shaft outward to assure proper positioning of said shoe below the lip of the slot 248. The upper face of the bed-plate 242 is provided with laterally-disposed ways 250 to receive and guide a casing 252 which contains the several mechanical contact-makers for the electric circuits. Pivoted at the numeral 251, to the rear end of the casing 252, is an angle-lever 253, the short arm of which has a plug 254, held removably therein by a clamp-screw 255 and adapted to rest against the surface of the work to be reduced for a predetermined amount; while the long arm of said lever 253 carries at its free end an adjustable thumb-screw 256. Disposed below the angle-lever 253 and near the upper end thereof, are a pair of contact-makers, the upper one 257 of which is pivoted at 258 on the casing and will normally rest with its weighted end 257' against a stop-pin 259; while at its opposite end it carries a platinum contact-member 260 which is disposed within the path of the screw 256 as the lever 253 descends. The second or lower contact-maker 261 is pivoted at 262 to the casing 252, and its weighted end 261' will cause a projection 263 of said lever to come normally to rest against an adjustable stop-screw 264, in such a manner as to leave a platinum contact pin 265 carried in its opposite end, clear of the member 260 as well as out of contact with another contact-pin 266 to be hereinafter referred to. The contact-pin 265 is preferably insulated from its carrier arm 261, and is attached to one end of a conductor 267 (see also Fig. 1) the other end of which has a small plug 268 adapted to be inserted into any one of a series of metallic bushings 269 carried in the front face of the platen 35, but insulated therefrom, as shown in Fig. 17, all of said bushings being, however, electrically connected, by a conductor 270, with one terminal of an electric battery 271. The other terminal of this battery is connected by a conductor 272, with the electro-magnet 240, above mentioned, and then grounded in the machine, so that when the contact-pins 260 and 265 are in touch, the circuit for the magnet 240 is completed by virtue of grounding through arm 257 and the return movement of the pawl-carrier 206 is consequently reduced in the manner described. It should be remembered that thus far the contact-member 265 is still clear of the contact-pin 266 above referred to, so that the feeding-operation of the grinding-wheel toward the work will be continued under two-teeth advances, as above stated, until the work has been reduced to the required finished size, at which time the contact-pins 265 and 266 will be brought into touch with each other through the continued descent of the feeler-lever 253. The contact-pin 266 constitutes one terminal of another electrical circuit and is attached to one end of a conductor 273, the other end of which carries a large plug 274 (see Figs. 18 and 1) adapted to be inserted into any one of a series of metallic bushings 275, also carried in the front face of the platen 35, but insulated therefrom, the several bushings being electrically connected through a conductor 276, with one terminal of an electric-battery 277, the other terminal of which is connected by a conductor 278 with an electro-magnet 279, (see Figs. 1 and 11) and thence grounded in the machine.

The electric-circuit above described is closed by the contact of the platinum points 260 and 265, upon the reduction of the work to its finished size, and the magnet 279 will then attract an armature 280, on pawl-arm 208, and withdraw the same from the ratchet-wheel 211, whereupon a locking-plate 281, carried by a blade-spring 282 which is secured to the pawl-carrier 206, will engage the upper face of said armature 280 and thus retain the pawl 208 in its inoperative or disengaging position, even after the electric circuit of the magnet 279 is broken. It is, of course evident that the feed of the grinding-wheel is thus completely stopped without requiring any attention on the part of the operator.

In order to establish a clear and full understanding of the manner in which the sizing device may be properly set to give a certain predetermined result, the following description may serve as an example: Let it be supposed that the work W has been ground to a true diameter of 1.500 and that a certain portion of its surface shall be ground to measure 1.462 inches, or in other words .038 smaller in diameter; the machine must then be set so that the grinding-wheel feed will be continued until .019 shall have been removed from all around the work, this .019, therefore, constituting the actual feeding-in distance for the grinding-wheel. The casing 252 is then moved on the ways 250 until the feeler-plug rests against the surface of the work W without causing any break in the touch-contact between any adjacent pair of the members 256, 260, 265 and 266 above referred to. This setting movement can be readily accomplished by means of a micrometer-screw 285, in engagement with a threaded bushing or nut 286 secured in the casing 252 by a set-screw 287. The front end of said screw 285 is shouldered at 288 and rests in a bearing 289 (attached to a projecting ledge 290 of the bed-plate 242) and carries a hand-knob 291 keyed thereto and held in place thereon by a nut 292. Supported on the knob-hub 291 and adjacent to the bearing 289 is a graduated ring 293, each division of which will produce a .001 inch movement of the sizing device in the ways 250, and an index-mark 294 is provided on the outer surface of the bearing 289 to coact with the division marks on said knob. In order to minimize the liability of mistakes in setting the sizing device for gaging the grinding-wheel feed, which in the present instance is equal to .019 of an inch, the ring 293 is frictionally held on the knob 291, so that it may then be rotated thereon until its zero mark is in alinement with the index-mark 294 on the bearing 289. By rotating the screw knob 291, and with it the ring 293, until the nineteenth mark of the latter registers with the index-mark 294, the device S is ready for work, and the lever 253 will then be raised from the position shown in Fig. 16, thus allowing the weighted ends of the contact-makers 257, 261 to raise said arms and break the contacts thus far existing between the several pins carried thereby. As the grinding-wheel is being fed toward the work by the ratchet and pawl-mechanism above described, and the work W consequently reduced step by step, the feeler plug 254 will naturally approach the center of the work, thereby permitting the lever 253 gradually to descend until finally the several elements of the sizing device have regained the position shown in Fig. 16, and the electrical circuits have become operative in respectively reducing and finally arresting the feed movement.

In order to adapt the machine above described, for the many varieties of work, and especially to enable the operator to grind tapers, the table or platen 35 is pivoted near its longitudinal center at 34, on the carriage 33. In general practice the tapers of different pieces of work are given in the working drawings in either one of the following ways, viz: first, the diameter at the extreme ends of a tapered body of a certain length; or secondly, the angular deflection, in degrees, of the surface relative to the axis of the work; or thirdly, the proportionate inclination of the surface relative to a certain length of work-base. Of these the first-mentioned method is the most unsatisfactory, inasmuch as the operator is obliged either to compute the angular deflection from the dimensions supplied to him, or to set the table by using his own personal judgment, then grinding the work at the points indicated to him and then keeping and adjusting the table until the micrometer measurements at these points conform to the dimensions given in the drawings. The second method is far superior to the first method, inasmuch as the carriages of the later date machines are provided with graduations which enable the operator to swing the table into the required angular position without any particular trouble and yet with the assurance that the work will be finished in accordance with the angle given. The third method, which specifies a certain proportionate inclination of the work-surface relative to a certain length of base, as for example a pitch of "one fourth of an inch to the foot," is almost universally employed in "standard tapers," and my invention has for one of its objects the provision on the carriage of a properly graduated scale which will enable the operator to set the platen to the required pitch without the necessity of computation or measuring. In order clearly to illustrate the peculiar graduation of the scale, attention is called to Figs. 2, 19, 20, 21 and 22, in which the platen 35 is shown provided with an index-mark 300 which, when the table 35 is swung about its trunnion 34, will pass in front of a scale 301, secured upon the carriage 33, and the zero-mark of which is in alinement with the index-mark 300, when the table is in its true or "straightway" position. Secured on top of the carriage 33, and passing through a slot 302 provided in the table 35, and concentric with the trunnion 34 thereof, is a bolt 303 having a handled clamp-nut 304, whereby the platen will be held against accidental displacement. When this nut is released the platen may be swung on its trunnion by a screw 305, the axis of which is disposed at a right-angle relative to the line of travel of the carriage, and which is in screw-threaded engagement with a nut-block 306, carried by the table 35 as follows: The nut-block 306 is provided at its upper face with a cylindrical projection 307 forming a shoulder 308 which contacts with the under side of the platen, and serving as a stud for a sleeve 309, which is journaled thereon and has a head-flange 310 for sliding along a recessed slot 311 radially disposed relatively to the pivot 34 of the table; while the several elements just named may conjointly be held together by a washer 312 and a screw 313, and covered by a plate 314 secured to the platen, it being understood, however, that the sleeve will be free to move in the slot 311 longitudinally thereof when the table is swung horizontally on the carriage 33. As previously stated, this movement is established by means of the screw 305, the front end of which is shouldered at 315 and journaled in a bearing 316, at the other side of which a hand-knob 317 is secured to the screw by a key 318 and nut 319, thus avoiding all longitudinal freedom of the screw relative to the bearing 316. Attached to the hub of the hand-knob 317, is an annulus 320, having a beveled face 321, which may be circumferentially divided into any desired number of parts, preferably one hundred and twenty-eight the several graduation-marks being read in connection with an index-mark 322 on the bearing 316.

Accepting the U. S. standard long measure of feet and inches as the controlling factor in determining measurements, the screw 305 is cut so that each convolution of its thread, or its so-called "pitch," is equal to a common fraction, as for instance, one-eighth, of an inch. Hence it will be evident that each graduated space of the one-hundred twenty-eight circumferential divisions of the annulus 320 signifies the movement of 1/1024 of an inch, on the part of the nut block 306. Referring now to the diagram shown in Fig. 21 and assuming the radius to be one foot, the several markings on the center-line of the screw, indicate successive units of advancing the nut block 306, resulting from successive individual rotations of the screw 305, so that each unit represents one-eighth of an inch. Consequently if the distance from the pivot point 34 of the table 35 to the point 323 of intersection between the axis of the screw and the longitudinal center line of the carriage, is equal to one foot, which again is equal to ninety six units of one-eighth of an inch each, the ratio of inclination between the center-line of the table and the longitudinal center-line of the carriage, can be readily ascertained; or in other words,—the first mark on the screw-axis represents an inclination of one-eighth of an inch to the foot, the second mark means an inclination of two-eighths, or one quarter of an inch to the foot, and so on, upward. In the diagram the lines $a$, $b$, $c$, $d$, represent the positions which the center line of the platen 35 will occupy to correspond with inclinations of 12/8, 24/8, 36/8, 48/8, equal to "one and one-half, three, four and one-half, and six inches, to the foot." respectively, as will be readily understood, and inasmuch as the nut block 306 is pushed along on the screw-axis to occupy the several stations indicated by successive complete rotations of the screw, it follows that by the use of the subdivisions on the annulus 320, the operator is enabled to increase the ratio of inclination per foot, by successive fractions of less than one-thousandth of an inch, which are fine enough to answer all practical purposes. It is, of course, evident that the sizes of the units, as well as the subdivisions on the annulus 320 may be changed to conform with any other system of linear or long measurement, as, for instance, the metric-system, without in any way affecting its purpose of utility, and also that decimal fractions may be used in lieu of the common-fractions above named. Now since an application of a unit-scale in alinement with the screw-axis would be rather a difficult matter and lead into complications of mechanical structure, I deem it advantageous to place the arcuate scale 301 (see Figs. 2 and 24) on the carriage 33, and to provide the table 35 with the index mark 300, above mentioned, the graduations of the scale being marked in alinement with the positions occupied by the center line of the table 35 during the step-by-step unit advances imparted by the consecutive complete rotations of the screw 305, and a close inspection and comparison of the graduation spaces of this scale will reveal the fact these arcuate spaces diminish in size as their distance from the zero-line on the carriage increases, a fact which is due to the decrease of the angle formed between the center line of the platen and the screw-axis, while the angle formed by said center-line and the arc of the scale remains constant, viz—a tangent or right angle.

The scale explained in the foregoing description is an exceedingly useful instrument, especially when employed in connection with the "universal grinding machines" employed for reducing the shanks of reamers, drills, and other similar articles, and also in grinding the interiors of collets and sockets, the sizes and tapers of which may vary according to the different standards prescribed by the different manufacturers, and when it is taken into consideration that all the various devices made to the standard of any one firm must fit together with absolute precision, this fit requiring exactness in diametrical sizes as well as in the taper, the importance of continuing some or all of the several features above described in one machine, will manifest itself at once, especially so, since such devices must be interchangeable, and the manufacture thereof must necessarily be on a large scale to meet the demands of the market.

The modification shown in Fig. 22 illustrates the line upon which the units are spaced off, as being disposed tangentially at a point beyond that of the deflecting-screw, so as to show more clearly the variations in the scale resulting from the radial lines drawn through the division points, and intersecting the arc described by the table. It will here be seen that the units $u$ are all equal to each other while the graduations of the scale corresponding to the spaces indicated by $u'$ are diminishing as they grow more distant from the zero line.

The invention is not limited to the exact disposition of elements illustrated and described, for changes may be made therein without departure from said invention.

From the preceding description it will be evident that my machine comprises in combination a work-support and a tool support one of which is movable in the direction of the axis of motion of the tool and one of said supports being angularly adjustable with respect to the other to taper the work, and in connection with said angularly adjustable support I provide a scale which is graduated to indicate the taper of the work relatively to a standard of linear measure by reason of which the advantages hereinbefore stated are possible. It is not a material manner as to how these several parts are related although in the present case what has been described as the "platen" is angularly adjustable and is also capable of movement in the direction of the axis of the reducing tool and also of the work.

Having thus described my invention, what I claim is—

1. The combination of a traveling carriage, a table supported by said carriage for swinging motion and having a longitudinal slot, a nut fitted in said slot for movement with respect to said table, and a screw for the nut supported by the carriage and non-endwise movable the screw and nut coöperating to angularly adjust said table.

2. The combination of a traveling carriage, a table supported by said carriage for swinging motion and having a longitudinal slot, a nut fitted in said slot for movement with respect to the table, a screw supported by the carriage and connected with said nut said screw being non-endwise movable and being coöperative with the nut to angularly adjust said table, and means for clamping the table to the carriage.

3. The combination of a traveling carriage, a table supported by said carriage for swinging motion and having a longitudinal slot, a work reducing device movable toward and from the work, transversely of the travel of the carriage the swinging motion of the table serving to angularly adjust the same to secure taper work, a scale coöperative with said table and graduated to indicate the taper of the work relative to a standard of linear measure, a nut fitted in said slot for movement relative to the table on the swing of the latter, and a non-endwise movable screw supported by said carriage and coöperative with said nut to adjust said table.

4. The combination of a table and a support to which said table is connected for swinging movement, a non-endwise movable screw supported by said support, and a nut for said screw having a longitudinally slidable and pivotal connection with said table.

5. The combination, with a base, a carriage movable thereon, a work-supporting table pivoted on said carriage, and means for determining the deflection of the table relative to a given length thereof, of a reversing-mechanism for said carriage; a work-reducing device movable at an angle relative to the line of carriage-travel; and a feed-mechanism for said device, and comprising a ratchet-and-pawl-mechanism controlled by said reversing-mechanism.

6. The combination, with a base, a carriage movable thereon, and means for actuating said carriage in opposite directions, of a work-reducing device movable on said base; a feed-mechanism therefor, and comprising a ratchet and pawl-mechanism, a rock-arm having segmental teeth, a pinion in engagement therewith, a crank-arm coöperative with the pinion, and a link connecting said crank-arm with said ratchet-and-pawl-mechanism.

7. The combination, with a base, a carriage movable thereon, and means for actuating said carriage in opposite directions, of a work-reducing device movable on said base; a feed-mechanism therefor, and comprising a ratchet-and-pawl-mechanism, a rock-arm having segmental teeth, a pinion in engagement therewith, and a crank-arm coöperating with the pinion; means for limiting the return-movement of said ratchet-and-pawl-mechanism; and a slotted link connecting said crank-arm therewith.

8. The combination, with a base, a carriage movable thereon, and means for actuating said carriage in opposite directions, of a work-reducing device movable on said base; and a feed-mechanism therefor, and comprising a ratchet and pawl mechanism, and a spring-actuated latch for retaining the pawl out of engagement with the ratchet.

9. The combination, with a base, a carriage movable thereon, and means for actuating said carriage in opposite directions, of a work-reducing device movable on said base; and a feed mechanism therefor, and comprising a ratchet-wheel and a pawl, a pawl-carrier therefor, and a spring-actuated latch carried by said carrier, and for retaining said pawl out of engagement with said ratchet.

10. The combination, with a base, a carriage movable thereon, and means for actuating said carriage in opposite directions, of a work-reducing device movable on said base; and a feed-mechanism therefor, and comprising a ratchet and pawl mechanism, and a stop screw for varying the return movement of said mechanism.

11. The combination, with a base, a carriage movable thereon, and means for actuating said carriage in opposite directions, of a work-reducing device movable on said base, and a feed-mechanism therefor, and comprising a ratchet and pawl-mechanism, means for disconnecting the pawl from the ratchet, and a spring-actuated latch for retaining said pawl in its disengaged position.

12. The combination, with a base, and a work-supporting carriage movable thereon, and a mechanism for reversing the movement of the carriage, and comprising an oscillatory arm, of a reducing-device; a feed-mechanism therefor, and comprising a ratchet-and-pawl mechanism; means for actuating this mechanism from said arm; a feeler-arm coöperative with the work-surface; an electro-magnet controlled thereby, and for disconnecting the pawl from the ratchet; and means for retaining said pawl in its disengaged position.

13. The combination, with a base, and a work-supporting carriage movable thereon, and a mechanism for reversing the movement of the carriage, and comprising an oscillatory arm, of a reducing-device; a feed-mechanism therefor, and comprising a ratchet-and-pawl mechanism; means for actuating this mechanism from said arm; a feeler-arm coöperative with the work-surface; an electro-magnet controlled thereby, and for disconnecting the pawl from the ratchet, and a spring-actuated latch for retaining said pawl in its disengaged position.

14. The combination, with a base, a work-supporting carriage movable thereon, and a mechanism for reversing the movement of the carriage, and comprising an oscillatory arm, of a reducing-device, a feed-mechanism therefor, and comprising a ratchet-and-pawl-mechanism; means for actuating this mechanism from said arm; a lever having a stop-pin; and means for actuating said lever to check the return-movement of the ratchet-and-pawl-mechanism at a predetermined time.

15. The combination, with a base, and a work-supporting carriage movable thereon, and a mechanism for reversing the movement of the carriage, and comprising an oscillatory arm, of a reducing-device; a feed-mechanism therefor; a lever having a stop-pin; and an electro-magnet for actuating said lever to check the return-movement of the ratchet-and-pawl-mechanism at a predetermined time.

16. The combination, with a base, and a work-supporting carriage movable thereon, and a mechanism for reversing the movement of the carriage, and comprising an oscillatory arm, of a reducing-device; a feed-mechanism therefor; a lever having a stop-pin, and having an armature; an electro-magnet coöperative therewith; a feeler-lever contacting with the work; and a circuit for said magnet, and controlled by said lever.

17. The combination, with a base, a work-supporting carriage movable thereon, a work-reducing device, and a feed-mechanism therefor, of a power-driven shaft; a series of gears secured thereon; a shaft connected with, and for driving, said carriage; a series of gears loose thereon, and in engagement with said first-mentioned gears; and means for connecting any one of said loose gears with the shaft.

18. The combination, with a base, a work-supporting carriage movable thereon, a work-reducing device, and a feed-mechanism therefor, of a power-driven shaft; a series of gears secured thereon; a shaft connected with, and for driving, said carriage; a series of gears loose thereon, and in engagement with said first-mentioned gears; means for connecting any one of said loose gears with the shaft; and a clutch-mechanism for reversing the movement of the driving-shaft.

19. The combination, with a base, a work-supporting carriage movable thereon, a work-reducing device, and a feed-mechanism therefor, of a power-driven shaft; a series of gears secured thereon; a shaft connected with, and for driving, said carriage; a series of gears loose thereon, and in engagement with said first-mentioned gears; and a shiftable key for connecting any one of said loose gears with the shaft.

20. The combination, with a base, a work-supporting carriage movable thereon, a work-reducing device, and a feed mechanism therefor, of a power-driven shaft; a series of gears secured thereon; a shaft connected with, and for driving said carriage; a series of gears loose thereon, and in engagement with said first-mentioned gears; a key on the driving-shaft; and a rod for bringing said key into engagement with any one of said gears.

21. The combination, with a base, a work-supporting carriage movable thereon, a work-reducing device, and a feed-mechanism therefor, of a power-driven shaft; a series of gears secured thereon; a shaft connected with, and for driving, said carriage; a series of gears loose thereon, and in engagement with said first-mentioned gears; a key on the driving shaft; a rod for bringing said key into engagement with any one of said gears; and a rack and pinion-device for moving said rod.

22. The combination, with a base, a work-supporting carriage movable thereon, a work-reducing device, and a feed-mechanism therefor, of a power-driven shaft; a series of gears secured thereon; a shaft connected with, and for driving, said carriage; a series of gears loose thereon, and in engagement with said first-mentioned gears; a key on the driving-shaft, a rod for bringing said key into engagement with any one of said gears; a rack-and-pinion device for moving said rod; and means for locking said rod against movement.

23. The combination, with a base, a carriage movable thereon, a table pivoted on said carriage, and means for determining the deflection of the table relative to a given length thereof, of a work-reducing device; a feed-mechanism therefor; and a sizing-device for controlling the action of the feed-mechanism.

24. The combination, with a base, a carriage movable thereon, a reversing-mechanism for said carriage, a table pivoted thereon, and means for determining the deflection of the table relative to a given length thereof, of a work-reducing device; a feed-mechanism therefor, and actuated by said reversing-mechanism; and a sizing-device for controlling the action of the feed-mechanism.

In testimony whereof I affix my signature in presence of two witnesses.

BENGT M. W. HANSON.

Witnesses:
KATH. T. M. O'CONNELL,
JOEL W. JOHNSON.